(12) United States Patent
Sood et al.

(10) Patent No.: US 8,725,947 B2
(45) Date of Patent: May 13, 2014

(54) CACHE CONTROL FOR ADAPTIVE STREAM PLAYER

(75) Inventors: Vishal Sood, Bothell, WA (US); Raymond Cheng, Sammamish, WA (US); Harry S. Pyle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 12/790,663

(22) Filed: May 28, 2010

(65) Prior Publication Data

US 2011/0296109 A1    Dec. 1, 2011

(51) Int. Cl.
*G06F 12/00*    (2006.01)

(52) U.S. Cl.
USPC .............. 711/118; 709/219; 709/231; 725/94

(58) Field of Classification Search
None
See application file for complete search history.

(56) References Cited

U.S. PATENT DOCUMENTS

| | | | |
|---|---|---|---|
| 6,185,625 B1 * | 2/2001 | Tso et al. ....................... | 709/247 |
| 6,721,850 B2 | 4/2004 | Hofmann et al. | |
| 7,028,096 B1 * | 4/2006 | Lee ............... | 709/231 |
| 7,647,614 B2 | 1/2010 | Krikorian et al. | |
| 2002/0154691 A1 | 10/2002 | Kost et al. | |
| 2005/0262257 A1 * | 11/2005 | Major et al. .................. | 709/231 |
| 2006/0224759 A1 | 10/2006 | Fang et al. | |
| 2008/0126095 A1 | 5/2008 | Sideman | |
| 2009/0282475 A1 | 11/2009 | George et al. | |

OTHER PUBLICATIONS

Smooth Streaming Deployment Guide—Published Date: 2000 http://www.forum.persianadmins.com/showthread.php?p=38796 (11 pages).
Streaming Media—Retrieved Date: Apr. 1, 2010 http://edoc.hu-berlin.de/conferences/eunis2001/poster/Lanyi/PDF/Lanyi.pdf (2 pages).
An Assessment of the Development of Internet GIS—Retrieved Date: Apr. 1, 2010 http://proceedings.esri.com/library/userconf/proc97/proc97/to550/pap526/p526.htm (24 pages).

* cited by examiner

*Primary Examiner* — Matthew Bradley
*Assistant Examiner* — Alan Otto
(74) *Attorney, Agent, or Firm* — Ben Tabor; David Andrews; Micky Minhas

(57) ABSTRACT

An adaptive stream player that has control over whether a retrieved stream is cached in a local stream cache. For at least some of the stream portions requested by the player, before going out over the network, a cache control component first determines whether or not an acceptable version of the stream portion is present in a stream cache. If there is an acceptable version in the stream cache, that version is provided rather than having to request the stream portion of the network. For stream portions received over the network, the cache control component decides whether or not to cache that stream portion. Thus, the cache control component allows the adaptive stream player to work in offline scenarios and also allows the adaptive stream player to have rewind, pause, and other controls that use cached content.

17 Claims, 3 Drawing Sheets

CACHE CONTROL FOR ADAPTIVE STREAM PLAYER

BACKGROUND

Digital stream is widely distributed in the information age and is available in many digital communication networks such as, for example, the Internet. Examples of a digital video stream may include, for example, video streams and audio streams. Audio streams and other data (such as text) may accompany video streams. Stream players receive streaming content, and render the same on the display of the client. Adaptive stream players monitor client conditions and adjust the stream accordingly. For instance, if the client's processor was quite busy, and the network bandwidth was being heavily utilized, the adaptive stream player may adjust the quality of one or more streams downward to reduce processing and network utilization associated with the stream. In the case of a video stream, if the player window were a smaller size, the adaptive stream player may request a lower resolution of stream suitable for the smaller window. Every second or every few seconds, the adaptive stream player determines how to adjust the stream appropriate for current conditions, and makes an appropriate request to the stream source.

Stream players often run in web browsers. Browsers often have the ability to cache content, so as to respond more quickly to future client requests for content. However, the decision to cache or not cache content is native to the browser, and not in control of the adaptive stream player. In addition, in some cases, the stream player is not run within a browser environment or the browser has caching disabled.

BRIEF SUMMARY

At least one embodiment described herein relates to an adaptive stream player that has control over whether retrieved stream is cached in a local stream cache that is on the same computer as the adaptive stream player. The adaptive stream player monitors conditions of the computing system, and request a stream one portion at a time. The characteristics of the requested stream portion may change from one requested portion to the next if conditions of the computing system change, thereby causing the stream rendering to be adaptive to local conditions.

For at least some of the stream portions, before requesting a stream portion having particular characteristics, a cache control component first determines whether or not an acceptable version of the stream portion is present in the stream cache. In one embodiment, if there is an acceptable version in the stream cache, that version is provided rather than having to request the stream portion of the network. In one embodiment, for any stream portions received over the network, the cache control component decides whether or not to cache that stream portion.

Thus, the cache control component allows the adaptive stream player to work in offline scenarios and also allows the adaptive stream player to have rewind, pause, and other controls that use cached content.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 3 illustrates a flowchart of a method for an adaptive stream player to render a stream using a computing system that the adaptive stream player runs on.

DETAILED DESCRIPTION

In accordance with embodiments described herein, an adaptive stream player has control over whether a retrieved stream is cached in a local stream cache. For at least some of the stream portions requested by the player, before going out over the network, a cache control component first determines whether or not an acceptable version of the stream portion is present in a stream cache. If there is an acceptable version in the stream cache, that version is provided rather than having to request the stream portion over the network. For stream portions received over the network, the cache control component may decide whether or not to cache that stream portion. Thus, the cache control component allows the adaptive stream player to work in offline scenarios and also allows the adaptive stream player to have rewind, pause, and other controls that use cached content. First, some introductory discussion regarding computing systems will be described with respect to FIG. 1. Then, the embodiments of the adaptive stream player caching operations will be described with respect to FIGS. 2 and 3.

Figure 1:
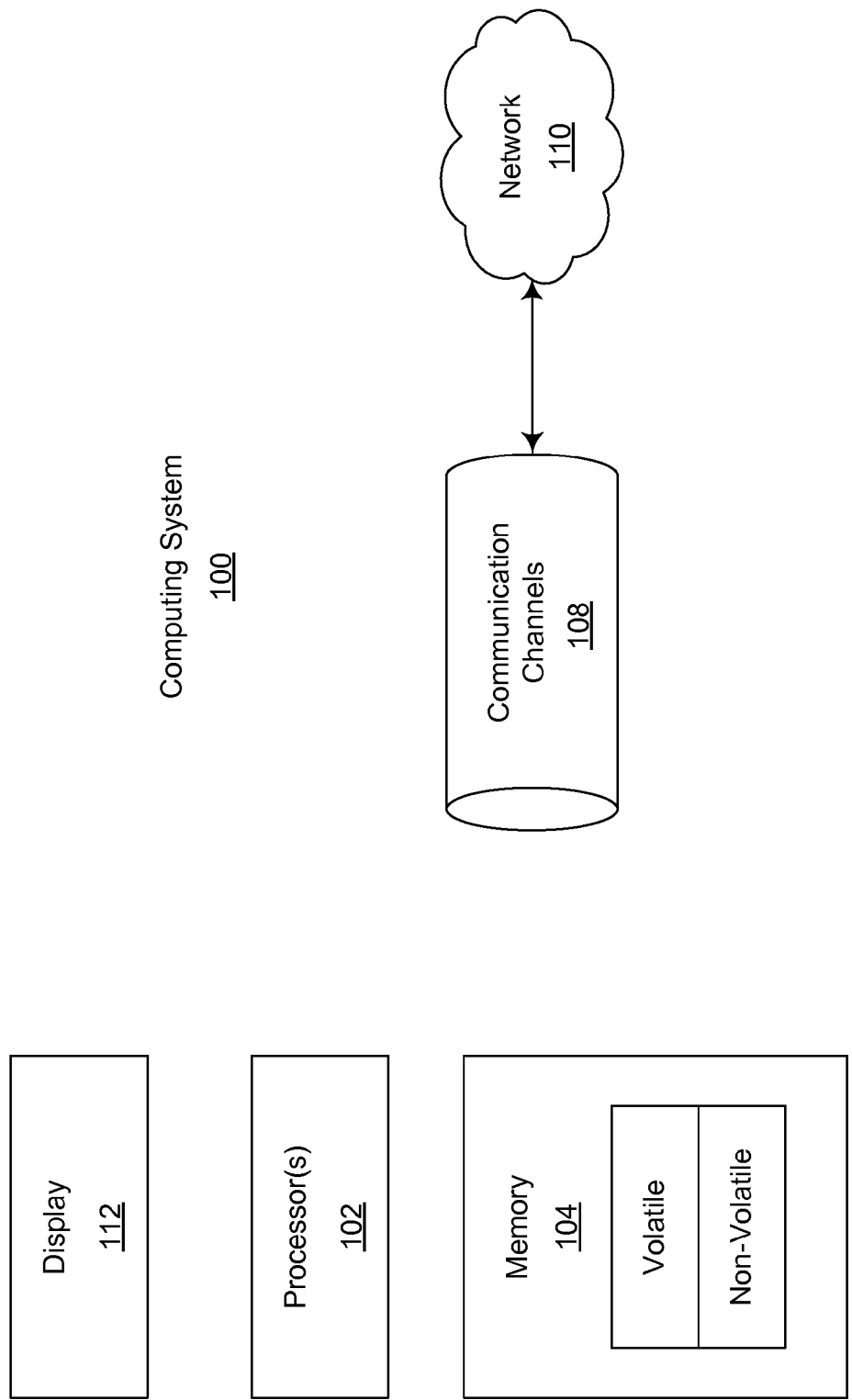
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
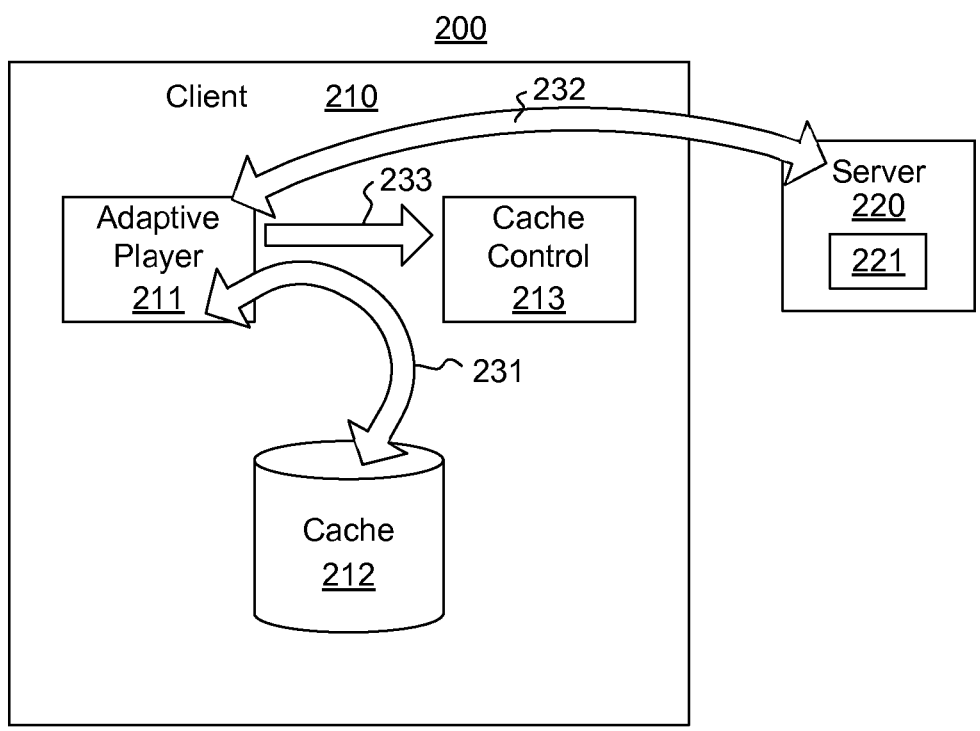
FIG. 2 illustrates a network environment in which a client computing system is in communication with a server computing system for purposes of obtaining a stream.

FIG. 2 illustrates a network environment 200 in which a client computing system 210 is in communication with a server computing system 220. The client computing system 210 includes an adaptive stream player 211 that is capable of rendering stream on a display, a stream cache 212, and a caching control component 213. The server computing system 220 includes a stream source 221 that may provide stream portions to the client computing system 210 in response to requests from the adaptive stream player. As an example, the adaptive stream may be a video stream, in which case there may be supplemental information provided within the video stream, such as, for example, a synchronized audio stream and perhaps data such as text. In that case, the adaptive stream player may be, for example, an adaptive video player. In the case of an audio stream, there might be supplemental information within the stream such as, for example, text or images. However, the principles of the present invention are not limited to the type of stream, as the stream may be any stream even if not a video stream or an audio stream.

The client computing system 210 and the server computing system 220 may each be structured as described above for the computing system of FIG. 1, although the server computing system 220 need not have a display. The computing system 210 is referred to as a "client" because it receives services in the form of a stream. However, this does not imply that the computing system 210 cannot act to provide services to other computing systems. Furthermore, the computing system 220 is referred to as a "server" because it provides streaming services. However, this does not imply that the server computing system 220 cannot act as a client computing system to receive services from yet other computing systems. Accordingly, the term "client" and "server" are used merely to distinguish one computing system from another in the context of the streaming service.

The adaptive stream player 211 renders received stream on a display (such as display 112 of FIG. 1). The adaptive stream player also requests the stream not as a complete segment, but rather one portion at a time. For instance, perhaps the adaptive stream player 211 requests the stream in two second segments, although the broader principles are not limited to the temporal size of the segment. The stream player 211 is "adaptive" in that it requests a different quality of stream depending on the current conditions on the client 210.

For instance, the player 211 may monitor processor utilization, network usage, or the usage of any other resource that may affect the ability of the adaptive stream player 211 to access and render the stream. In the case of an adaptive video player, the player 211 may also monitor the size of the window in which the stream is to be rendered. For example, suppose that the network bandwidth availability was low, but there was significant processor resources available, the player 211 may request a video with a lower quality and/or a higher compression rate. Such a video portion would be smaller but the processing required to decompress may be greater. However, this might be a suitable balance for a client that has access to processor resources, but lacks in network bandwidth. As another example, suppose the display window for the video was quite small. In that case, the adaptive video player might request a low resolution image since the pixel resolution within the window is not sufficient to render all the information associated with a higher resolution image. Should the user later expand the window to perhaps full screen size, then the adaptive video player may sense this, and correspondingly request the next video portion to be of higher resolution. Thus, adaptive stream players more efficiently use available resources with reduced risk of unnecessary resource utilization. Adaptive stream players are known in the art.

What is not known in the art, however, is any control by the adaptive stream player of stream caching. In FIG. 2, the client computing system 210 includes a stream cache 212 that is local to the adaptive stream player 211, and configured to selectively store stream portions at the direction of a cache control component 213. The cache control component 213 is under the control of the adaptive stream player 211 such that before the adaptive stream player 211 makes a request for a stream portion having particular characteristics, the cache control 213 first verifies whether or not an acceptable version of the stream portion is present in stream cache.

In FIG. 2, the adaptive stream player 211 is a decision making component that decides which of the available versions of a stream portion should be requested in response to current conditions at the client 210. However, an adaptive stream player may be more broadly thought of as including both the decision making component 211 as well as the cache control component 213.

Figure 3:
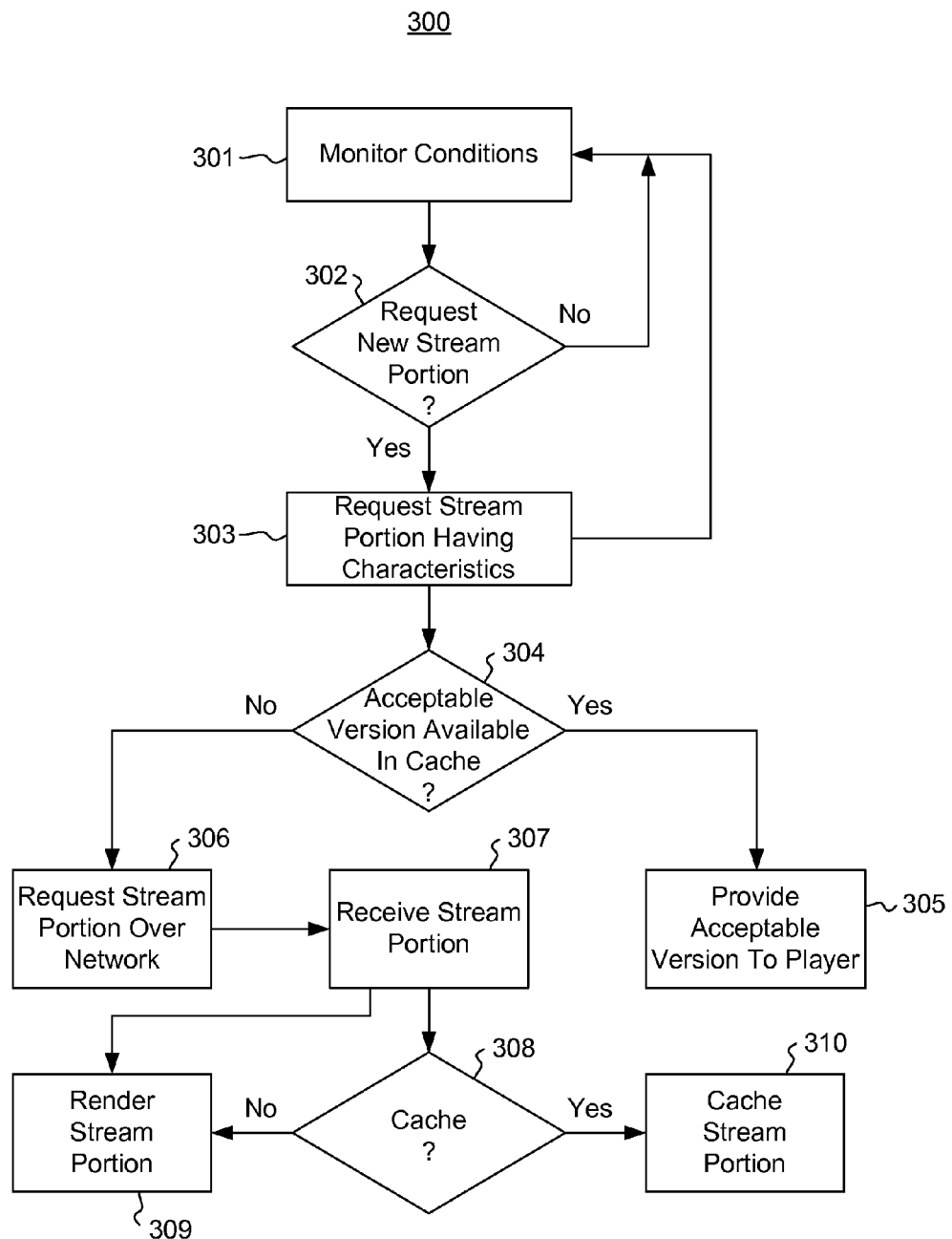

FIG. 3 illustrates a flowchart of a method 300 for an adaptive stream player to render a stream on computing system that the adaptive stream player runs on. As the method 300 may be performed in the environment 200 of FIG. 2, FIG. 3 will now be described with frequent reference to the environment 200 of FIG. 2.

The adaptive stream player monitors conditions of the computing system (act 301). For instance, the adaptive stream player 211 of FIG. 2 is monitoring the conditions at the client 210. Examples of such conditions were previously mentioned but include, for example, processor utilization, network bandwidth availability, and rendering limitations (such as window size in the case of video rendering). This monitoring operation, although listed as a separate act, may be a fairly continuous operation that occurs in the background while the remainder of method 300 is executed.

If it is not yet time to make a request for a new stream portion (No in decision block 302), then processing continues, and the adaptive stream player simply continues to monitor client conditions. If it is time to make a request for a stream portion (Yes in decision block 302), then the adaptive stream player makes a request for a stream having particular characteristics (act 303). In one example, the adaptive stream player may request stream portions in two second segments. In that case, the adaptive stream player will make requests approximately every two seconds, give or take. Also, the processing flow would continue with the making of the request (act 303) on a periodic basis. However, for now, the processing flow for a single request will be described, with the principles described for this single request being repeatable for multiple requests.

The characteristics of the stream portion requested may differ from one request to the next due to changing conditions at the client. For instance, suppose that a user was watching a video representing episode 13 of a user's favorite situation comedy. Now suppose that the user is currently watching a two second video portion spanning from 8 seconds to 10 seconds into episode 13 in a relatively small window. When the adaptive stream player requested this video portion, the adaptive stream player requested a low resolution version of the video portion spanning from 8 seconds to 10 seconds. Now suppose at second 9, the user increases the window size to full screen size. The adaptive stream player senses this, and requests a higher resolution for the next video portion from 10 seconds to 12 seconds. In practical application, however, there may be some buffering of a few seconds in memory to account for some latency in request-response time in stream delivery. Accordingly, perhaps the portion spanning 10 to 12 seconds is already in memory. Accordingly, upon adjusting the window, the user might notice some delay before higher resolution video is being rendered.

For some or all of the stream portions requested, the cache control component verifies whether or not an acceptable version of the stream portion is present in a stream cache that is on the computing system (act 304). An "acceptable" version, as the term is used herein, includes at least the stream portion having the particular characteristics requested by the adaptive stream player. However, the term "acceptable" version may also encompass alternative characteristics that may still be suitable for the adaptive stream player. For instance, suppose an adaptive video player has decided that the next video portion should have a resolution of 580 vertically and 750 horizontally, the cached video portion might not be exactly the same resolution, but may still be usable and acceptable to the adaptive video player. For example, suppose the cached version is 600 vertically and 760 horizontally. With some adjustment, the adaptive video player may determine the cached version is still an acceptable version of the video portion.

If the acceptable version of the stream portion is present in the stream cache (Yes in decision block 304), then the acceptable version of the stream portion is provided to the adaptive stream player (act 305). Referring to FIG. 2, for example, arrow 231 represents the process of the adaptive stream player 211 acquiring the acceptable version of the stream portion from the stream cache 212 via the cache control component 213.

On the other hand, if the acceptable version of the stream portion is not present in the stream cache (No in decision block 304), the stream portion having the particular characteristics is requested over the network (act 306). Referring to FIG. 2, for example, arrow 232 represents the process of the adaptive stream player 211 going to the server computing system 220 to request the stream portion having the particular characteristics from the stream source 221. The adaptive stream player then provides the obtained stream portion to the cache control component 213 as represented by arrow 233.

Upon receiving the requested stream portion (act 307), the cache control component determines whether or not to cache the retrieved stream portion in the stream cache (decision block 308). If the adaptive stream player determines that the retrieved stream portion should not be cached (No in decision block 308), the retrieved stream portion is rendered on the display (act 309) without being cached. If the cache control component determines that the retrieved stream portion should be cached (Yes in decision block 308), the retrieved stream portion is cached in the stream cache (act 310) in addition to being rendered (act 309). The stream cache 212 may have been at least partially populated in this manner by performing act 309 for prior stream portion requests. However, the stream cache 212 may also include stream acquired in any other manner, even if the stream was not previously requested by the adaptive stream player 211.

In one embodiment, the cache control component interacts with the stream cache using an application program interface. Likewise, the stream player may also interact with the cache control component using an application program interface. For instance, there may be an interface for checking whether or not there is an acceptable version of a stream portion in the stream cache. There may also be an interface for determining whether or not a retrieved stream portion should be cached.

Accordingly, what is described is an efficient mechanism for selectively satisfying stream requests from an adaptive stream player from cached stream, and for selectively caching stream portions once retrieved. The caching operations are under the control of the adaptive stream player.

These features enable significant scenarios including off-line access to stream content through the use of the adaptive stream player. For instance, movies may be purchased or rented using the principles described herein wherein some or all of the purchased or rented video may be resident on the local client. Furthermore, live stream navigation (such as pause, rewind, or fast forward to live) may be enabled by using the cached memory to satisfy the stream navigation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media having stored thereon computer-executable instructions that, when executed by one or more processors of the computing system, cause a computing system to implement a method of adaptive streaming of content from a network, where the method is comprised of:
   instantiating in a computer memory of the computing system an adaptive stream player that includes a stream cache and a cache control component;
   when executed by one or more processors of the computing system, the adaptive stream player performing the following:
      monitoring conditions of the computing system, wherein the monitored conditions include a display window size, network bandwidth availability, and computing system processor resource availability;
      requesting a stream one portion at a time over a network;
      requesting one or more stream portions having particular characteristics, the particular characteristics of the one or more stream portions depending on the monitored current conditions of the computing system;
   the cache control component storing at least some of the requested stream portions in the stream cache; and
   when playing a stream, before the adaptive stream player makes a request for a portion of a stream having particular characteristics, the cache control component first determining whether or not an acceptable version of the stream portion to be requested is present in the stream cache, a cached stream portion being an acceptable version only if it has the particular characteristics determined by the current conditions of the computing system, and if so, playing the acceptable version of the stream portion, and if not, proceeding with the request from the network and playing the requested stream portion on the adaptive stream player, so that some portions of the stream are played using stream portions requested from the network but which are not currently stored in the stream cache when played, and some portions of the stream are played using cached portions of the stream.

2. The computer program product in accordance with claim 1, wherein, when proceeding with the request from the network, the cache control component determines whether or not to cache the requested stream portion in the stream cache.

3. The computer program product in accordance with claim 2, wherein, when proceeding with the request from the network, if the cache control component determines that the requested stream portion should not be cached, the requested stream portion, once retrieved, is provided to the adaptive stream player without being cached, and
   wherein if the cache control component determines that the retrieved stream portion should be cached, the retrieved stream portion is cached in the stream cache.

4. The computer program product in accordance with claim 1, wherein the acceptable version of the stream portion can only be a stream portion having particular characteristics that match current conditions of the computing system.

5. The computer program product in accordance with claim 1, wherein the acceptable version of the stream portion is a stream that does not have the particular characteristics, but has acceptable alternative characteristics that match current conditions of the computing system.

6. The computer program product in accordance with claim 1, wherein the adaptive stream player comprises:
   a decision making component that is configured to monitor the conditions of the computing system.

7. The computer program product in accordance with claim 1, where the adaptive stream player interacts and controls the cache control component via an application program interface.

8. The computer program product in accordance with claim 1, wherein the stream cache includes a stream that was not previously requested by the adaptive stream player.

9. A method for adaptive streaming of content accessed over a network in order to render a stream on a display of a computing system, the method comprising:
   instantiating in a computer memory of the computing system an adaptive stream player that includes a stream cache and a cache control component;
   requesting one or more stream portions having particular characteristics, the particular characteristics of the one or more stream portions depending on current conditions of the computing system, the current conditions including a display window size, network bandwidth availability, and computing system processor resource availability;
   the cache control component storing at least some of the requested stream portions in the stream cache; and when playing a stream, before the adaptive stream player makes a request for a portion of a stream having particular characteristics, the cache control component first determining whether or not an acceptable version of the stream portion to be requested is present in the stream cache, a cached stream portion being an acceptable version only if it has the particular characteristics determined by the current conditions of the computing system, and if so, playing the acceptable version of the stream portion, and if not, proceeding with the request from the network and playing the requested stream portion on the adaptive stream player, so that some portions of the stream are played using stream portions requested from the network but which are not currently stored in the stream cache when played, and some portions of the stream are played using cached portions of the stream.

10. The method in accordance with claim 9, wherein, when proceeding with the request from the network, the cache control component determines whether or not to cache the requested stream portion in the stream cache.

11. The method in accordance with claim 10, wherein the adaptive stream player comprises a decision making component that is configured to monitor the conditions of the computing system.

12. The method in accordance with claim 9, wherein the stream cache includes a stream that was not previously requested by the adaptive stream player.

13. The computer program product in accordance with claim 9, wherein, when proceeding with the request from the network, if the cache control component determines that the requested stream portion should not be cached, the requested stream portion, once retrieved, is provided to the adaptive stream player without being cached, and wherein if the cache control component determines that the retrieved stream portion should be cached, the retrieved stream portion is cached in the stream cache.

14. The method in accordance with claim 9, wherein the acceptable version of the stream portion can only be a stream portion having particular characteristics that match current conditions of the computing system.

15. The method in accordance with claim 9, wherein the acceptable version of the stream portion is a stream that does not have the particular characteristics, but has acceptable alternative characteristics that match current conditions of the computing system.

16. The method in accordance with claim 9, where the adaptive stream player interacts and controls the cache control component via an application program interface.

17. A computer program product comprising one or more computer storage media having stored thereon computer-executable instructions that, when executed by one or more processors of the computing system, cause a computing system to implement a method of adaptive streaming of content from a network, where the method is comprised of:

instantiating in a computer memory of the computing system an adaptive stream player that includes a stream cache and a cache control component;

when executed by one or more processors of the computing system, the adaptive stream player performing the following:

monitoring conditions of the computing system, wherein the monitored conditions include a display window size, network bandwidth availability, and computing system processor resource availability;

requesting a stream one portion at a time over a network;

requesting one or more stream portions having particular characteristics, the particular characteristics of the one or more stream portions depending on the monitored current conditions of the computing system;

the cache control component storing at least some of the requested stream portions in the stream cache;

when playing a stream, before the adaptive stream player makes a request for a portion of a stream having particular characteristics, the cache control component first determining whether or not an acceptable version of the stream portion to be requested is present in the stream cache, a cached stream portion being an acceptable version only if it has the particular characteristics determined by the current conditions of the computing system, and if so, playing the acceptable version of the stream portion, and if not, proceeding with the request from the network; and when proceeding with the request from the network, if the cache control component determines that the retrieved stream portion should not be cached, the retrieved stream portion is provided to the adaptive stream player without being cached, and then playing the retrieved stream portion on the adaptive stream player, so that some portions of the stream are played using stream portions retrieved from the network but which are not currently stored in the stream cache when played, and some portions of the stream are played using cached portions of the stream; and if the cache control component determines that the retrieved stream portion should be cached, the retrieved stream portion is cached in the stream cache.

* * * * *